United States Patent
De Pena et al.

(10) Patent No.: US 10,926,466 B2
(45) Date of Patent: Feb. 23, 2021

(54) INTEGRATED BUILD AND MATERIAL SUPPLY FOR AN ADDITIVE MANUFACTURING APPARATUS

(71) Applicants: HEWLETT-PACKARD DEVELOPMENT COMPANY, L.P., Houston, TX (US); Alejandro Manuel De Pena, Sant Cugat del Valles (ES); Fernando Juan, Viladecavalls (ES); Pau Martin, Sant Cugat del Valles (ES)

(72) Inventors: Alejandro Manuel De Pena, Sant Cugat del Valles (ES); Fernando Juan, Viladecavalls (ES); Pau Martin, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 322 days.

(21) Appl. No.: 15/509,084

(22) PCT Filed: Oct. 2, 2014

(86) PCT No.: PCT/EP2014/071190
§ 371 (c)(1),
(2) Date: Mar. 6, 2017

(87) PCT Pub. No.: WO2016/050311
PCT Pub. Date: Apr. 7, 2016

(65) Prior Publication Data
US 2018/0229301 A1 Aug. 16, 2018

(51) Int. Cl.
*B29C 64/255* (2017.01)
*B33Y 30/00* (2015.01)
(Continued)

(52) U.S. Cl.
CPC ............ *B29C 64/255* (2017.08); *B22F 3/003* (2013.01); *B22F 3/1055* (2013.01);
(Continued)

(58) Field of Classification Search
CPC .............................. B22F 3/1055; B22F 3/003; B22F 2003/1057; B33Y 50/02; B33Y 10/00;
(Continued)

(56) References Cited

U.S. PATENT DOCUMENTS 5,437,820 A * 8/1995 Brotz ...................... B29C 35/10
264/497
5,976,448 A * 11/1999 Haruta .................. B29C 64/165
264/401
(Continued)

FOREIGN PATENT DOCUMENTS

| CN | 101326046 | | 12/2008 |
|---|---|---|---|
| CN | 101668450 | A | 3/2010 |

(Continued)

OTHER PUBLICATIONS

Cambridge Dictionary entry for "abut." (Year: 2020).*
(Continued)

*Primary Examiner* — Jessee R Roe
*Assistant Examiner* — Rebecca Janssen
(74) *Attorney, Agent, or Firm* — HP Inc. Patent Department

(57) ABSTRACT

An integrated build and material supply system (12) for an additive manufacturing apparatus comprises a building compartment (24) adapted to accommodate an object (50) to be formed by means of additive manufacturing and a storage compartment (22) adapted to store a build material for forming said object. A volume of said building compartment and a volume of said storage compartment are variable in size, and said system is adapted to re-allocate at least a
(Continued)

Figure 1:
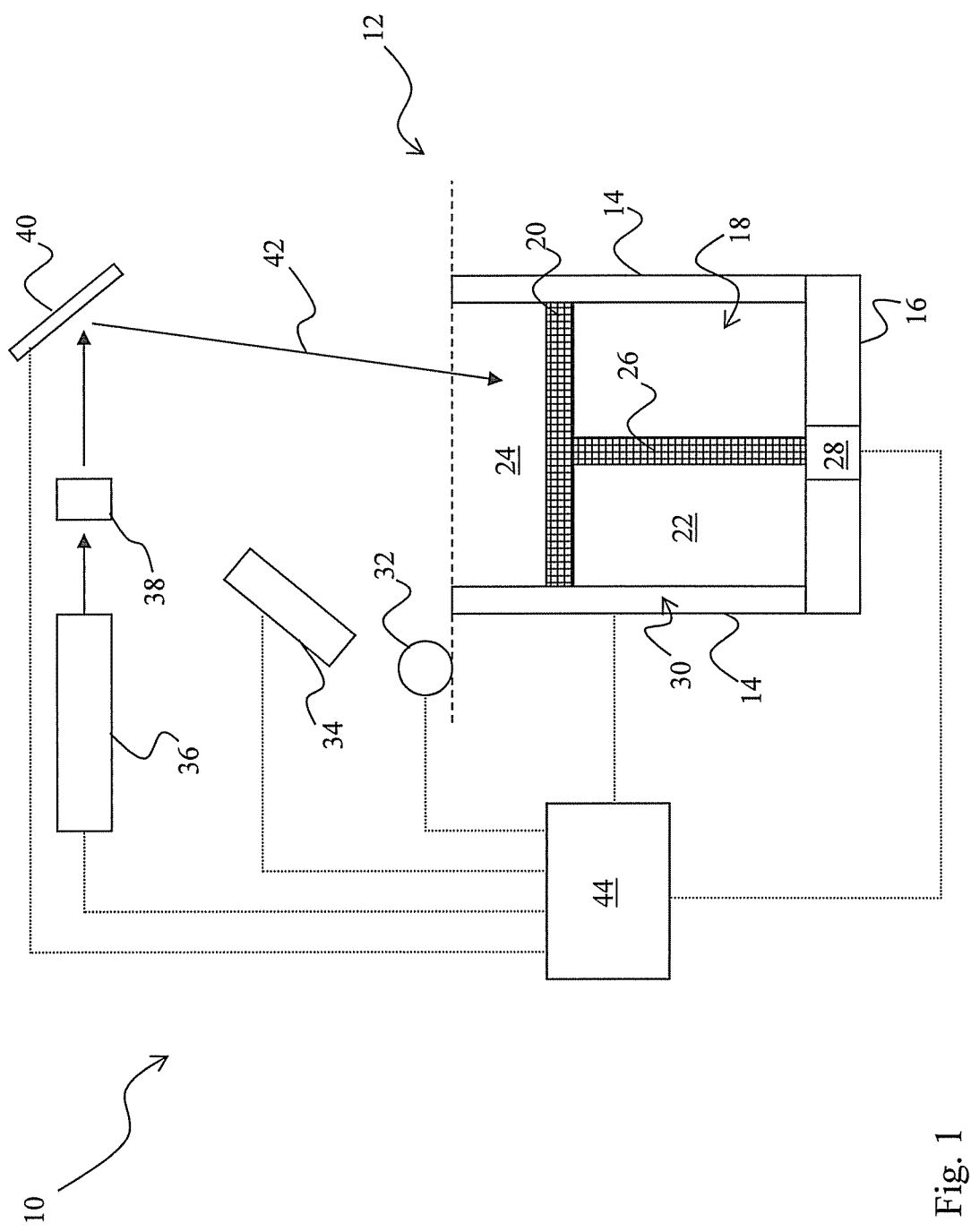

portion of a volume previously allocated to said storage compartment to said building compartment.

1 Claim, 4 Drawing Sheets

(51) Int. Cl.
- *B33Y 40/00* (2020.01)
- *B29C 64/321* (2017.01)
- *B22F 3/00* (2006.01)
- *B22F 3/105* (2006.01)
- *B33Y 10/00* (2015.01)
- *B33Y 50/02* (2015.01)
- *B29C 64/165* (2017.01)
- *B29C 64/153* (2017.01)
- *B29C 64/393* (2017.01)

(52) U.S. Cl.
CPC ............ *B29C 64/321* (2017.08); *B33Y 10/00* (2014.12); *B33Y 30/00* (2014.12); *B33Y 40/00* (2014.12); *B33Y 50/02* (2014.12); *B22F 2003/1057* (2013.01); *B29C 64/153* (2017.08); *B29C 64/165* (2017.08); *B29C 64/393* (2017.08)

(58) Field of Classification Search
CPC ......... B33Y 40/00; B33Y 30/00; B29C 64/20; B29C 64/321; B29C 64/153; B29C 64/393; B29C 64/255; B29C 64/165; B29C 64/00–295; Y02P 10/29–295
See application file for complete search history.

(56) References Cited

U.S. PATENT DOCUMENTS

| | | | |
|---|---|---|---|
| 7,291,002 B2 | 11/2007 | Russell et al. | |
| 8,003,040 B2 | 8/2011 | El-Siblani | |
| 8,172,562 B2 | 5/2012 | Mattes | |
| 8,562,324 B2 | 10/2013 | Pettis | |
| 8,734,694 B2 | 5/2014 | Perret et al. | |
| 2001/0045678 A1 | 11/2001 | Kubo et al. | |
| 2008/0241404 A1* | 10/2008 | Allaman | B29C 64/165 |
| | | | 427/333 |
| 2013/0000549 A1 | 1/2013 | Hartmann | |
| 2013/0078325 A1 | 3/2013 | Sperry et al. | |
| 2013/0287933 A1 | 10/2013 | Kaiser et al. | |
| 2014/0034214 A1 | 2/2014 | Boyer et al. | |
| 2014/0178585 A1 | 6/2014 | Swanson et al. | |

FOREIGN PATENT DOCUMENTS

| | | | |
|---|---|---|---|
| DE | 4414775 | 10/1995 | |
| DE | 4414775 A1 * | 10/1995 | ........... G03F 7/0037 |
| FR | 2912620 | 8/2008 | |
| JP | H09-314679 | 12/1997 | |
| JP | 2004308772 | 11/2004 | |
| JP | 2009-508723 | 3/2009 | |
| JP | 2010-518933 | 6/2010 | |
| JP | 2011528973 | 12/2011 | |
| WO | WO97/29901 | 8/1997 | |

OTHER PUBLICATIONS

VX500 3D-Printing—A Dimension Beyond; http://www.hellopro.fr/documentation/doc_societe/425341__057df7675dd3f166fc356b9b8fc69a4f.pdf.

Voxeljet Expands Its Product Offering with the Launch of the Vx2000 Industrial 3d Printer at Euromold http://www.marketwatch.com/story/voxeljet-expands-its-product-offering-with-the-launch-of-the-vx2000-industrial-3d-printer-at-euromold-2013-12-03.

* cited by examiner

INTEGRATED BUILD AND MATERIAL SUPPLY FOR AN ADDITIVE MANUFACTURING APPARATUS

BACKGROUND

Additive manufacturing (AM), in particular 3d printing, relates to techniques for making 3-dimensional objects of almost any shape from a 3d model or other electronic data source through additive processes, in which 3d objects are generated on a layer-by-layer basis under computer control. A large variety of additive manufacturing technologies have been developed, differing both in the build materials, the deposition techniques and the physical processes by which the 3d object is formed from the build material. Such techniques range from applying ultraviolet light to photopolymer resin, to melting semi-crystalline thermoplastic materials in powder form, to electron-beam melting of metal powders.

Additive manufacturing processes usually begin with a 3-dimensional computer model of the object to be manufactured. This digital representation of the object is virtually sliced into layers by computer software. Each layer represents a cross-section of the desired object, and is sent to the additive manufacturing machine, that may in some instances also be known as a 3d printer, where it is built upon a previously built layer. This process is consecutively repeated until the object is completed, thereby building the object layer-by-layer. While some available technologies directly deposit material, others use a recoating process to faun additional layers that can then be selectively patterned in order to create the new cross-section of the object.

The build material from which the object is manufactured may vary depending on the manufacturing technique and may comprise powder material, paste material, slurry material or liquid material. The build material is usually provided in a source container from where it needs to be transferred to the building area or building compartment where the actual manufacturing takes place.

SHORT DESCRIPTION OF THE DRAWINGS

Figure 2A:
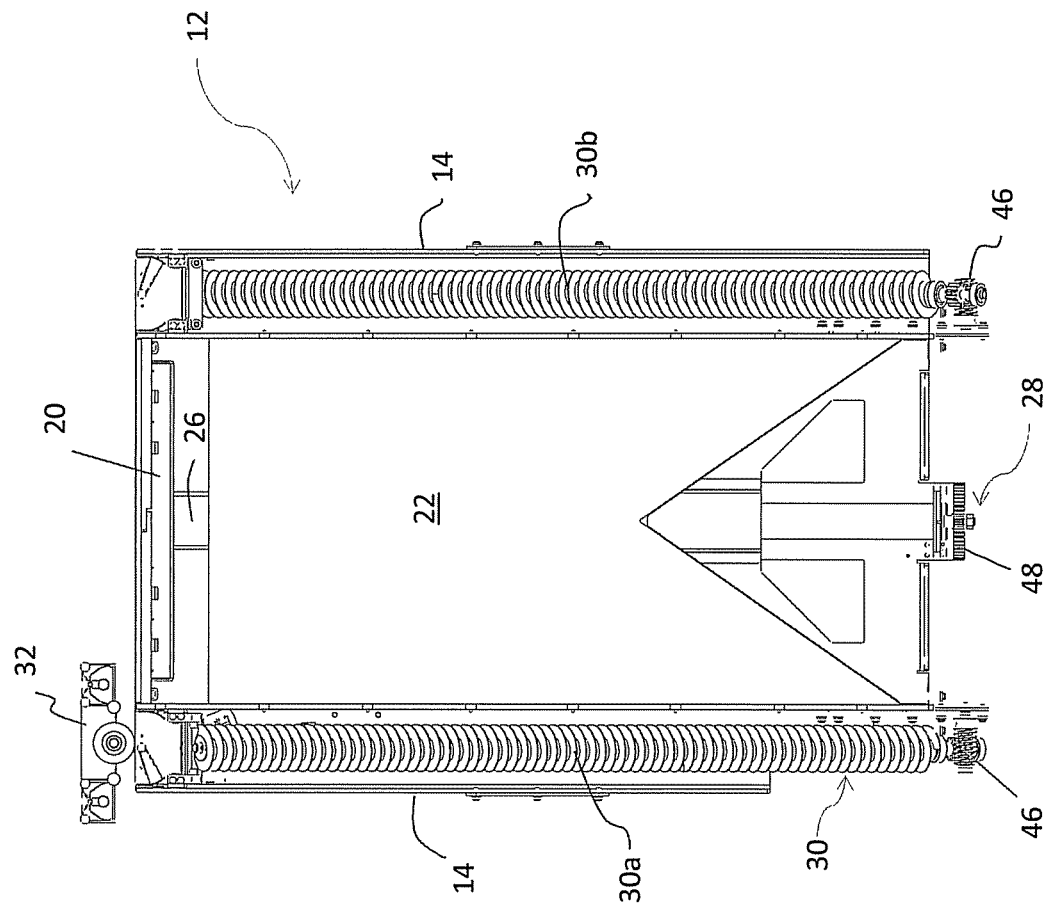
Figure 2B:
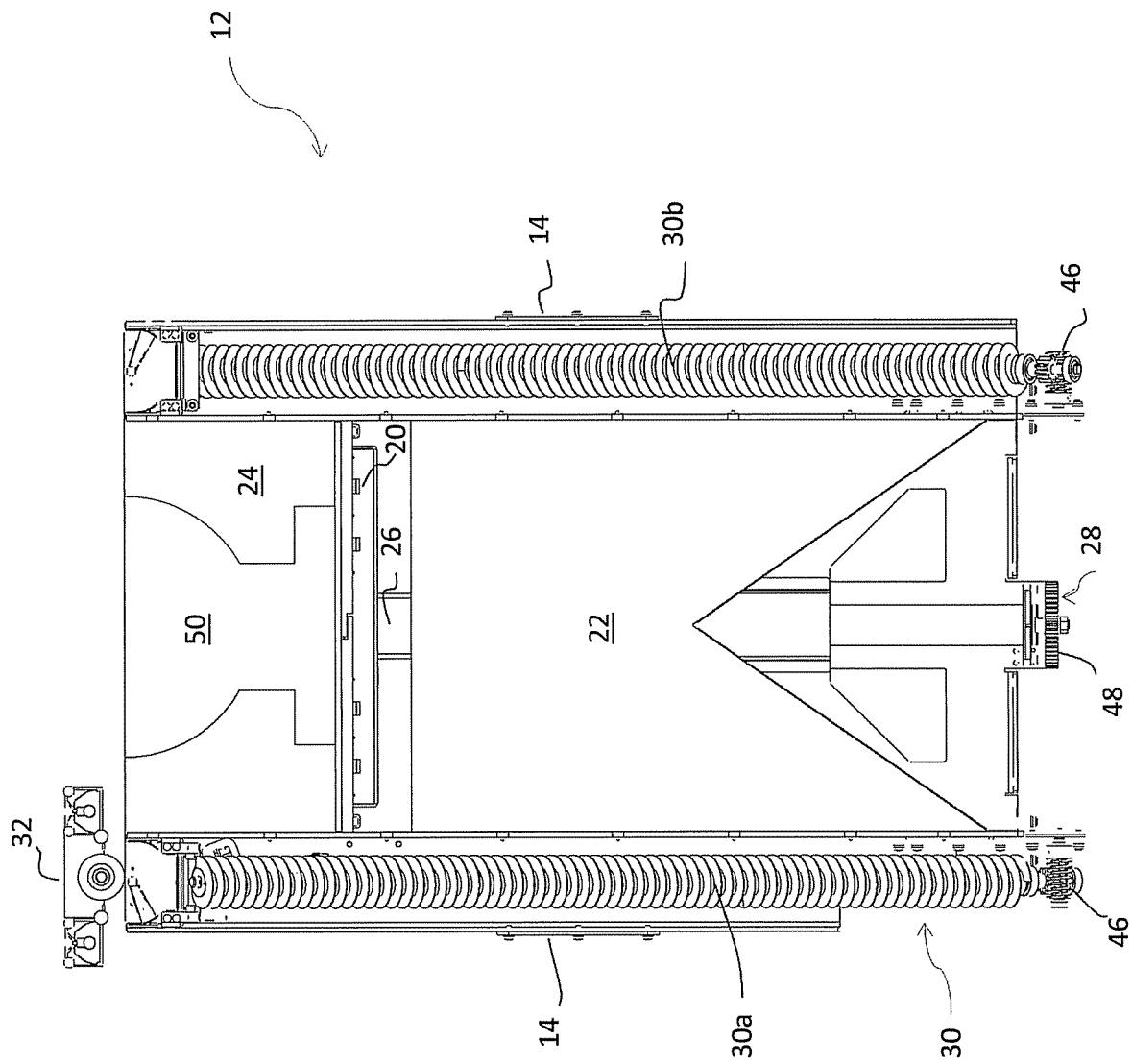
Figure 2C:
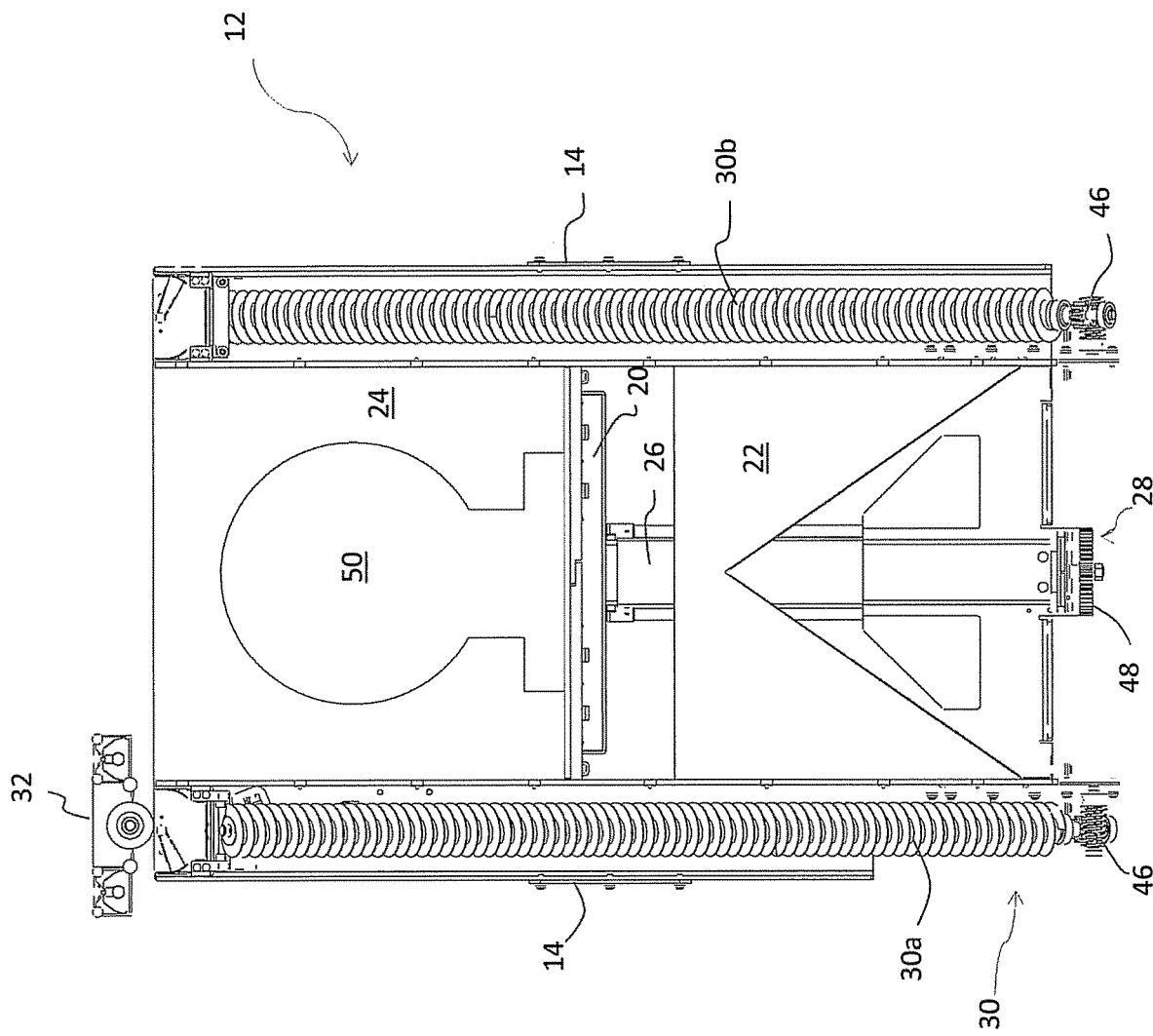

FIG. 1 is a schematic view of an additive manufacturing apparatus comprising an integrated build and material supply system according to an example; and FIGS. 2a to 2c show an integrated build and material supply system according to an example at different stages during the manufacturing process.

Examples described herein provide an integrated build and material supply system for an additive manufacturing apparatus. In one example said system comprises a building compartment adapted to accommodate an object to be formed by means of additive manufacturing, and a storage compartment adapted to store a build material for forming said object. A volume of said building compartment and a volume of said storage compartment are variable in size, and said system is adapted to re-allocate at least a portion of a volume previously allocated to said storage compartment to said building compartment or vice versa.

The building compartment, in the sense of one example, may denote any space or area in which an object is formed by means of additive manufacturing. The building compartment may be an enclosed space, but may alternatively be at least partially open at a top surface to an environment, such as to allow the introduction of build material into the building compartment and/or the interaction of the build material with radiation or heat sources that may be employed in the manufacturing process.

The storage compartment may denote an open or closed space adapted to store at least one build material that is employed in forming said object.

A volume of said building compartment may be understood to denote a volume of the compartment devoid of build material or excess material or the manufactured object.

Similarly, a volume of said storage compartment may denote a volume of the storage compartment devoid of build material.

Said system may preferably be adapted to increase said volume of said building compartment as said object is being formed.

Said system may preferably be adapted to reduce said volume of said storage compartment as said object is being formed.

According to an example, said building compartment adapted to accommodate said object to be formed and said storage compartment adapted to store said build material for forming said object are integrated in the same physical space or volume, so that a volume of said building compartment may be increased as the volume of said storage compartment is reduced, or vice-versa.

In an example, said system comprises a common compartment that comprises said building compartment and said storage compartment.

Said common compartment may be defined in terms of a common housing that accommodates both said storage compartment and said building compartment.

Said system may be adapted to re-allocate a portion of said common compartment previously allocated to said storage compartment to said building compartment, or vice versa.

Integrating the building compartment and the storage compartment in accordance with the examples described herein has the advantage of short supply paths. Since the travel distance of the build material from the storage compartment to the building compartment is reduced, the risk of degradation of the build material through contamination is mitigated accordingly. Having the build material in the lowermost position is preferred in terms of machine stability (lower center of gravity), and facilitates that the user can supply the build material to the storage compartment. The user convenience is thus enhanced.

At the same time, the improved integrated build and material supply system allows to provide a more compact additive manufacturing apparatus. The object to be formed requires more space as the manufacturing progresses, whereas less and less space is required for storing the build material. Conversely, the volume of the building compartment may be reduced when the finished object is removed from the additive manufacturing apparatus, while the volume of the storage compartment may be increased as new build material for forming subsequent objects is added. Increasing the volume of said building compartment at the expense of the volume of said storage compartment, or vice-versa, allows to allocate the volumes flexibly as the manufacturing progresses, and hence minimizes the total (combined) volume of the building compartment and the storage compartment, thereby saving space.

Said object to be formed may be any 3d object which is suitable to be formed by means of additive manufacturing.

The system may further comprise a movable separation element that separates said storage compartment from said building compartment.

Said separation element may be movably positioned in said common compartment or housing.

Providing a common compartment that accommodates both the building compartment and the storage compartment and a movable separation element allows to vary the volume of the building compartment and the volume of the storage compartment in accordance with the manufacturing progress simply by changing a position of said separation element in said common compartment.

Said system may comprise a drive unit adapted to move said separation element.

Many additive manufacturing apparatuses come equipped with a build platform for supporting the object to be formed. Typically, the build platform is movable and is connected to a drive mechanism that changes the position of the build platform as additional layers of build material are processed. The build platform may, thus, conveniently work as a separation element for separating said building compartment from said storage compartment.

In an example of the, said separation element hence comprises a build platform for supporting said object to be formed, or supporting layers of build material formed beneath and/or around said object.

In one example said building compartment may be located above said storage compartment.

For example, many powder-based additive manufacturing systems have the building compartment above a build platform that moves downwardly as additional layers are added to the object to be fainted. In these systems, the storage compartment may advantageously be located below the build platform, and its volume may be decreased as the build platform moves downwardly in accordance with the manufacturing progress.

Providing the storage compartment below the building compartment, hence close to the ground level, also simplifies the refilling of the build material. It also gives more stability to the apparatus because of the low-lying center of gravity.

However, in other examples said building compartment may be located beneath said storage compartment, or may be located adjacent to said storage compartment.

A rate at which said volume of said building compartment increases may correspond to a rate at which said volume of said storage compartment decreases, or vice versa. A rate, in the sense of this example, may be given in terms of a change of volume per time unit.

While said volume of said building compartment and/or said volume of said storage compartment may be variable, the respective maximum volumes may have a fixed size relation.

In an example, a maximum volume of said storage compartment is no smaller than 1.0 times a maximum volume of said building compartment.

In another example, a maximum volume of said storage compartment is no larger than 1.6 times a maximum volume of said building compartment.

In one example, a maximum volume of said storage compartment is no smaller than 1.2 times a maximum volume of said building compartment.

In one example, a maximum volume of said storage compartment is no larger than 1.5 times a maximum volume of said building compartment.

In one example the integrated build and material supply system may further comprise a transport unit adapted to transport build material from the storage compartment towards the building compartment.

In an example, said transport unit is adapted to transport said build material through a transport channel formed in a sidewall of said common compartment or storage compartment or building compartment.

In one example the transport unit may comprise a screw drive and/or a conveyor belt and/or a pump, depending on the nature and consistency of the build material.

In one example the transport unit may be operatively coupled to said drive unit adapted to move said separation element.

Coupling the transport unit and the drive unit allows to reduce the number of driving components in the additive manufacturing apparatus, and hence provides a simpler, more robust and more compact additive manufacturing apparatus.

Said transport mechanism may additionally be adapted to transport excess material from said building compartment to said storage compartment.

In a preferred example, the integrated build and material supply system is adapted to be removably attached to an additive manufacturing apparatus, such as a 3d printing apparatus.

According to this example, an integrated unit comprising both the build platform and the building compartment and the material supply system including the storage compartment can be provided as an independent unit that can be inserted into the additive manufacturing apparatus with a storage compartment full of build material prior to the manufacturing, and can be removed together with the completed 3d object after the manufacturing process has been completed and the storage compartment has been emptied or at least partially emptied, depending on the size of the object that was build. This provides a particularly flexible way of equipping an additive manufacturing apparatus with a supply of build material.

The improvement also relates to an additive manufacturing apparatus, in particular a 3d printing apparatus, comprising a system with some or all of the features described above.

The improvement further relates to a method for supplying build material for additive manufacturing, comprising a step of transporting build material from a storage compartment towards a building compartment, said storage compartment for storing said build material and said building compartment for forming an object from said build material by means of additive manufacturing. The method further comprises a step of re-allocating at least a portion of a volume previously allocated to said storage compartment to said building compartment in accordance with said transport of said build material from said storage compartment towards said building compartment.

Said storage compartment and/or said building compartment may be compartments with some or all of the features as described above. In particular, said storage compartment and/or said building compartment may be compartments of an additive manufacturing apparatus.

Optionally, the method may additionally comprise a step of additively forming said object in said building compartment using said build material.

Said build material may comprise a powder material and/or a paste material and/or a slurry material and/or a liquid material.

In one example, the method further comprises a step of moving a separation element that separates said storage compartment from said building compartment, thereby increasing said volume of said building compartment at the expense of said volume of said storage compartment, or increasing said volume of said storage compartment at the expense of said volume of said building compartment.

Said step of moving said separation element may be operatively coupled to said step of transporting said build material.

Said method may be implemented in an integrated build and material supply system or an additive manufacturing apparatus with some or all of the features described above.

The improvement further relates to a computer program product comprising computer-readable instructions, wherein said computer-readable instructions, when read by a computer coupled to a system or an additive manufacturing apparatus with some or all of the features described above, implement in said system or additive manufacturing apparatus, respectively, a method with some or all of the features described above.

An example will be described with reference to FIGS. 1 and 2a to 2c. This example relates to a selective laser sintering (SLS) system, which is an additive manufacturing technique that uses a laser as the power source to sinter powdered material, such as plastic, metal, ceramic, or glass powders into a mass that has the desired 3-dimensional shape. However, the improvement is not so limited, and is generally suitable for any additive manufacturing technique, regardless of whether the build material is a powder, paste, slurry, or liquid, and regardless of the energy source.

FIG. 1 is a schematic view of an additive selective laser sintering (SLS) additive manufacturing apparatus 10. The apparatus 10 comprises an integrated build and material supply system 12 according to an example of the present invention. As shown in FIG. 1, the integrated build and material supply system 12 has the form of a bucket enclosed by side walls 14 and a bottom wall 16. The top side is open, and this is where build material is applied to an object (not shown) formed on a build platform 20. The side walls 14 and bottom wall 16 define a common compartment 18 whose volume is divided by the build platform 20 into a storage compartment 22 below the build platform 20 and a building compartment 24 above the build platform 20 up to the level of the side walls 14. The upper boundary of the building compartment 24 is indicated in FIG. 1 by a dashed line.

The build platform 20 is movably mounted in the build bucket 12 and is connected via a piston 26 to a drive unit 28 which is adapted to move the build platform 20 upwards and downwards in the common compartment 18. As the platform 20 moves upwards and downwards in the common compartment 18, the volume $V_s$ of the storage compartment 22 and the volume $V_b$ of the building compartment 24 change accordingly. However, their sum remains constant and equals the volume $V_c$ of the common compartment 18, $V_s+V_b=V_c$=constant.

The storage compartment 22 serves for storing a build material for the additive manufacturing process, such as a plastic, metal, ceramic, or glass powder (not shown in FIG. 1). The build material is transported from the storage compartment 22 to the building compartment 24 by means of a transport unit 30, such as a screw drive integrated into the side walls 14. The transport unit 30 transports the build material to a roller unit 32, which serves to form a layer of the build material across the build platform 20 (or onto a previously formed layer of build material). A heating unit 34 may be included to pre-heat the powder accumulating in the building compartment 24. As shown in FIG. 1, the build platform 20 serves as the separation element and extends from abutment with a first sidewall of the common compartment, that includes the storage compartment 22 and building compartment 24, to abutment with an opposite sidewall of the common compartment. This is also shown in FIGS. 2b and 2c. As also shown in FIG. 1, the build platform 20 or separation element entirely separates said storage compartment from said building compartment. This is also shown in FIGS. 2b and 2c. As also shown in FIG. 1, a width of the building compartment 24 is equal to a width of the storage compartment 22. This is also shown in FIGS. 2b and 2c. Lastly, as also shown in FIG. 1, the building compartment 24 and storage compartment 22 are stacked vertically. This is also shown in FIGS. 2b and 2c.

In the present example, sintering is effected by means of an optical system comprising a laser 36, such as an ultraviolet or carbon dioxide laser, optical lenses 38 and an x-y scanning mirror 40. The x-y scanning mirror 40 directs a laser beam 42 emitted from the laser 36 and focused by the lens 38 onto selected portions of the powder material on the surface of the powder bed accumulated in the building compartment 24. The energy input from the laser beam 42 fuses the powder material, thereby binding the material together to create a solid structure. After each cross-section is scanned, the build platform 20 is lowered by one layer thickness, a new layer of material is formed on top by means of the roller unit 32, and the process is repeated until the object is completed.

A central control unit 44 controls the drive unit 28 to move the piston 26 and the build platform 20, the transport unit 30 to transport the build material from the storage compartment 22 to the building compartment 24, the roller unit 32 for applying the build material to the surface of the object to be manufactured, the heating unit 34, the laser 36 and the x-y scanning mirrors 40 for directing the laser beam 42 to selected portions of the build platform 20.

FIGS. 2a to 2c show the integrated build and material supply system 12 in additional detail at different stages during the manufacturing process.

FIG. 2a shows the integrated build and material supply system 12 at an initial stage in which the build platform 20 is at its uppermost position. The volume $V_s$ of the storage compartment 22 is hence maximum, whereas the volume $V_b$ of the building compartment 24 is zero.

As the manufacturing commences, build material is transferred from the bottom of the storage compartment 22 to the roller unit 32 by means of the transport unit 30. In the configuration shown in FIGS. 2a to 2c, the transport mechanism 30 comprises a pair of screw drives 30a, 30b provided in the side walls 14 of the bucket 12. As the screw drives 30a, 30b rotate, powder material is moved upwards through the side walls 14 until it reaches the top of the side walls 14, from where it is spread across the build platform 20 by means of the roller unit 32.

However, the screw drives 30a, 30b are merely one example of the transport mechanism, and other mechanisms such as conveyor belts, dragging mechanisms, pneumatic conveying systems (such as dense phase conveying or dilute phase conveying) may also be used.

A drive mechanism 46 of the transport unit 30 may be operatively or mechanically coupled to a drive mechanism 48 of the drive unit 28 as the drive mechanism 48 lowers the piston 26 and build platform 20. This may allow to automatically and simultaneously feed build material upwards through the side walls 14 by means of the drive unit 28. However, this need not happen in one continuous motion. E.g., the build platform 20 could be lowered, build material could then be transported out of the storage compartment 22, and after some delay the build platform 20 could be lowered again.

Liquid build materials may be transported by means of rotary vane pumps. Alternatively or additionally, liquids may be transported through channels in the side walls 14 purely by means of the hydrodynamic pressure exercised by the build platform 20 as the build platform 20 moves downwards in the common compartment 18. In this case, a separate drive mechanism for the transport unit 30 may not be required.

FIG. 2b shows the integrated build and material supply system 12 at an intermediate stage, at which the build platform 20 is partly lowered into the common compartment 18 in accordance with the manufacturing progress of an object 50 to be formed on the platform 20.

Typically, the object 50 would be surrounded on the platform 20 by non-solidified build material, but this is not shown in FIGS. 2b and 2c for clarity of the presentation.

In the configuration of FIG. 2b, the volume of the storage compartment $V_s$ has decreased in as much as the build platform 20 has been moved downwards in the bucket 12, whereas the volume $V_b$ of the building compartment 24 has increased by the same amount.

FIG. 2c shows the integrated build and material supply system 12 at a final stage in which the object 50 has been finished. Compared to the configuration of FIG. 2b, the build platform 20 has been lowered even further into the common compartment 18. Hence, the volume $V_s$ of the storage compartment 22 has been reduced still further in accordance with the amount of build material that has been transported to the building compartment 24 by means of the transport unit 30. The volume of the building compartment 24 has increased by the same amount that the volume $V_s$ of the storage compartment 22 has decreased.

At the end of the build, the residual powder in the compartment 22 may be reused for a future build. An excess of powder in compartment 22 is preferable to assure that the build can always be successfully finished and avoid running out of powder in the final layers.

The object 50 to be formed can now be removed from the excess powder material that has accumulated in the building compartment 24. The platform 20 can then be raised to the initial position shown in FIG. 2a, and a new object can be formed.

As can be taken from the description of FIGS. 1 and 2a to 2c, the integrated build and material supply system 12 integrates the storage compartment 22 for storing the build material and the building compartment 24 for manufacturing the object 50 within the same physical space, namely the common compartment 18. The build platform 20 separates the storage compartment 22 below from the building compartment 24 above. Both the volume $V_s$ of the storage compartment 22 and the volume $V_b$ of the building compartment 24 are hence variable and change in accordance with the position of the build platform 20 within the common compartment 18. As the build platform 20 is lowered in the common compartment 18, the volume $V_s$ of the storage compartment 22 decreases by the same amount that the volume $V_b$ of the building compartment 24 increases. The sum of the volume $V_s$ of the storage compartment 22 and the volume $V_b$ of the building compartment 24 remains constant and equals the volume $V_c$ of the common compartment 18, i.e. the volume of the build bucket 12: $V_s + V_b = V_c =$ constant. The different stages of the building process (corresponding to different positions of the build platform 20 within the bucket 12) hence merely differ in the shares according to which the common compartment 18 is divided into the storage compartment 22 and the building compartment 24.

Integrating the storage compartment 22 and the building compartment 24 into the same physical space has several advantages:

No excess space is wasted for a separate supply container. Hence, the additive manufacturing apparatus 10 is compact and small.

At the same time, the feed channels for transporting the build material from the storage compartment 22 to the building compartment 24 are close to the building compartment 24, thereby reducing the travel distance of the build material and thus the exposure of the build material to degradation through contamination.

Integration according to the present invention also simplifies the material containment and enhances the cleanliness of the printing.

The integrated build and material supply system 12 may be a fixed component of the additive manufacturing apparatus 10, but may also be designed as a removable element. In the latter case, it could also be provided as an independent consumable that can be changed by the user when the powder deposit has been emptied. The removable element constitutes a material supply with an integrated build platform 20 that could be bought full of build material and could be engaged with the additive manufacturing apparatus 10 when inserted, so that the movement of the piston 26 is controlled by the printer.

The description of the preferred embodiments and the Figures merely serve for illustrating the invention and the numerous advantages it entails, but should not be understood to imply any limitation. The scope of the invention is to be determined from the appended claims.

REFERENCE SIGNS

10 additive manufacturing apparatus
12 integrated build and material supply system/build bucket
14 side walls of integrated build and material supply system 12
16 bottom wall of integrated build and material supply system 12
18 common compartment
20 build platform
22 storage compartment
24 building compartment
26 piston of build platform 20
28 drive unit
30 transport unit
30a,b screw drives of transport unit 30
32 roller unit
34 heating unit
36 laser
38 optical lens
40 x-y scanning mirrors
42 laser beam
44 central control unit
46 drive mechanism of the transport unit 30
48 drive mechanism of the drive unit 28
50 object to be formed

The invention claimed is:

1. An integrated build and material supply system for an additive manufacturing apparatus, said system comprising:
a common compartment, the common compartment containing a building compartment to accommodate an object to be formed from a powdered build material by means of additive manufacturing and a storage compartment to store the powdered build material for forming said object, the building compartment and storage compartment being stacked vertically and having a same width within the common compartment;

a separation element separating the building compartment from the storage compartment within the common compartment wherein a volume of said building compartment and a volume of said storage compartment are variable in size depending on the location of the separation element in the common compartment, wherein movement of the separation element within the common compartment re-allocates at least a portion of a volume previously allocated to said storage compartment to said building compartment, or vice versa; and a transport system for moving the powdered build material from the storage compartment to the building compartment and to a roller for spreading the powdered build material on a build platform after the powdered build material is delivered by the transport system to the building compartment.

\* \* \* \* \*